United States Patent [19]

O'Neill et al.

[11] Patent Number: 4,569,308

[45] Date of Patent: Feb. 11, 1986

[54] COLLECTING APPARATUS PRIMARILY FOR CATCHING AND ELEVATING FOR EXAMPLE LIVE BIRDS IN A DEEP LITTER OR OPEN HOUSE SITUATION

[75] Inventors: James J. O'Neill, Warrenpoint; John P. G. Treanor; Gerald P. McGivern, both of Newry, all of Northern Ireland

[73] Assignee: Tamnaharry Developments Limited, Warrenpoint, Northern Ireland

[21] Appl. No.: 671,066

[22] Filed: Nov. 14, 1984

Related U.S. Application Data

[63] Continuation of Ser. No. 382,414, May 26, 1982, abandoned.

[30] Foreign Application Priority Data

May 28, 1981 [GB] United Kingdom ................ 8116347
Sep. 5, 1981 [GB] United Kingdom ................ 8126922

[51] Int. Cl.⁴ .............................................. A01K 45/00
[52] U.S. Cl. .................................................... 119/82
[58] Field of Search ............ 119/82; 56/348, DIG. 12

[56] References Cited

U.S. PATENT DOCUMENTS

| 743,008 | 11/1903 | Low | 56/348 |
|---|---|---|---|
| 1,255,275 | 2/1918 | Barnett et al. | 56/DIG. 12 |
| 3,672,335 | 6/1972 | Sanders | 119/82 |
| 3,805,744 | 4/1974 | Jochum | 119/82 |

FOREIGN PATENT DOCUMENTS 2411106 8/1979 France ................................ 119/82

Primary Examiner—Hugh R. Chamblee
Attorney, Agent, or Firm—Saidman, Sterne, Kessler & Goldstein

[57] ABSTRACT

Collecting apparatus for catching and elevating animate or inanimate objects comprises a mobile supporting framework mounting two elongate members (14, or 20, 21, or 30,31) adapted to be driven counter to one another and disposed with their axes parallel to one another and in use, to a supporting surface (9) across which the framework is intended to be moved. The members define therebetween a passage. Means (16) lesser in length than the passage is deep outstand from around the members. The elongate members (14, 21 or 31) rearward in the direction in which the framework is intended to be moved is nearer ground level (9) than the elongate member (14, 20 or 30) then to the front such that the ground clearance at the forward member enables passage of an object therebelow while that at the rear member prevents such passage and ensures that the means (16) thereon, in co-operation with the means (16) on the forward member, sweep the members (14, 20,21 or 30,31) and elevates the object or objects to the upper end of the passage for discharge therefrom to the next step in a series of steps.

9 Claims, 7 Drawing Figures

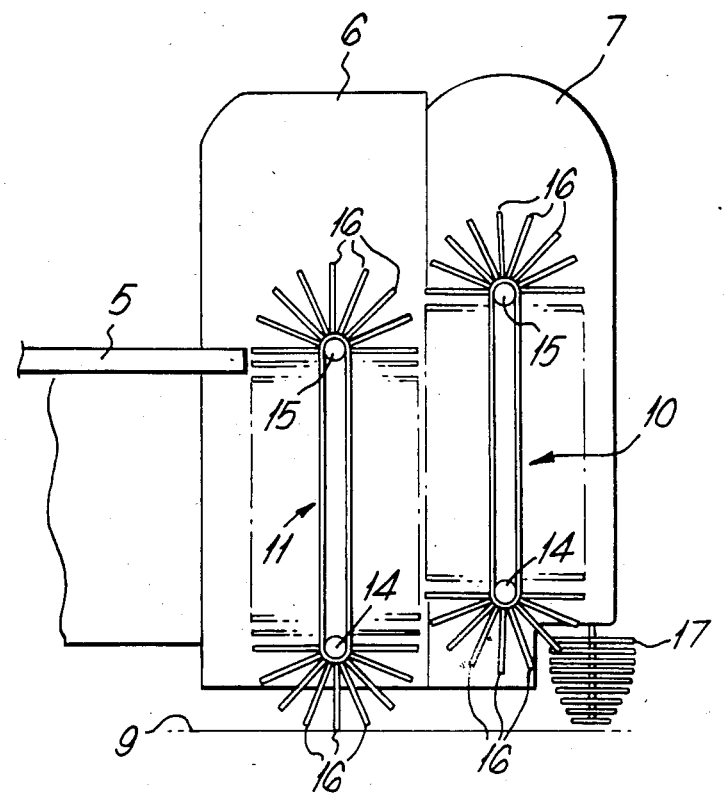

4,569,308

COLLECTING APPARATUS PRIMARILY FOR CATCHING AND ELEVATING FOR EXAMPLE LIVE BIRDS IN A DEEP LITTER OR OPEN HOUSE SITUATION

This application is a continuation of application Ser. No. 382,414, filed May 26, 1982 now abandoned.

FIELD OF THE INVENTION

This invention relates to collecting apparatus primarily for catching and elevating live birds such as broilers, pullets, turkeys, and other poultry or game birds being bred in a deep litter or open house situation as the initial step in a series of steps for example in preparing the birds for human consumption. The apparatus of the invention is also used for catching or picking-up and elevating rubbish from a rubbish-strewn area of land as the initial step in a series of steps in cleaning said land area.

BACKGROUND OF THE INVENTION

French Pat. No. 2 441 106 discloses a collecting apparatus for catching and elevating animate objects comprising a mobile supporting framework at which is mounted two elongate member 11 and 15 adapted to be driven counter to one another and disposed with their axes parallel to one another. The members define therebetween a passage at the lower end of which objects are caught and along which the caught objects are elevated in use of the apparatus. Fingers 12, 17 are outstanding from around the members, the fingers 17 on one member 15 being shorter than the passage is deep.

U.S. Pat. No. 3,672,335 discloses in FIGS. 9 and 10 collecting apparatus for catching and elevating animate objects comprising a mobile supporting framework on which is mounted two elongate members 230 or 240, respectively, adapted to be driven counter to a belt 112. The axes of members 230 and 240 and of a roller over which belt 112' travels are parallel. The members 230 and 240 and belt 112' define therebetween a passage at the lower end of which objects are caught and along which the caught objects are elevated in use of the apparatus. Fingers 232 or 246 the oustanding from around the member 230 or 240, the fingers being less in length than the passage is deep.

SUMMARY OF THE INVENTION

According to the present invention, collecting apparatus comprises a mobile supporting framework mounting two elongate rotatable members adapted to be driven counter to one another and disposed with their axes parallel to one another and to be, in use, substantially parallel to a supporting surface across which the framework is intended to be moved, the members defining therebetween a passage at the lower end of which animate or inanimate objects are caught and along which the caught objects are elevated in use of the apparatus.

The elongate member rearward in the direction in which the framework is intended to be moved is nearer ground level than the elongate member then to the front such that the ground clearance at the forward member enables passage of an object therebelow while that at the rear member prevents such passage. Fingers on both elongate members the object or objects are swept up into the passage between the members and elevates the object or objects to the upper end of the passage for discharge therefrom to the next step in the series of steps.

The rearward of the two elongate rotatable members is the lower terminal rollers of an endless conveyor, along which the caught objects are elevated in use of the apparatus, the conveyors having the fingers outstanding from their endless surfaces.

The two elongate members may also alternatively comprise a forward roller and a rearward lower terminal roller for a conveyor.

The fingers may be elements in the form of strips of deformable resilient foamed material or rows of spaced resilient bristles arranged longitudinally of the rollers or transversely of the conveyors, or may be a jacket of foamed material provided around the rollers or the conveyors.

Brushes rotating about vertical axes may be disposed on either side of the opening defined by the elongate members.

DESCRIPTION OF THE DRAWINGS

Embodiments of the present invention will now be described, by way of example, with reference to the accompanying drawings, in which:

FIG. 3 is a sectional view on the line III—III of FIG. 1;

DESCRIPTION OF THE PREFERRED EMBODIMENTS

Figure 1:
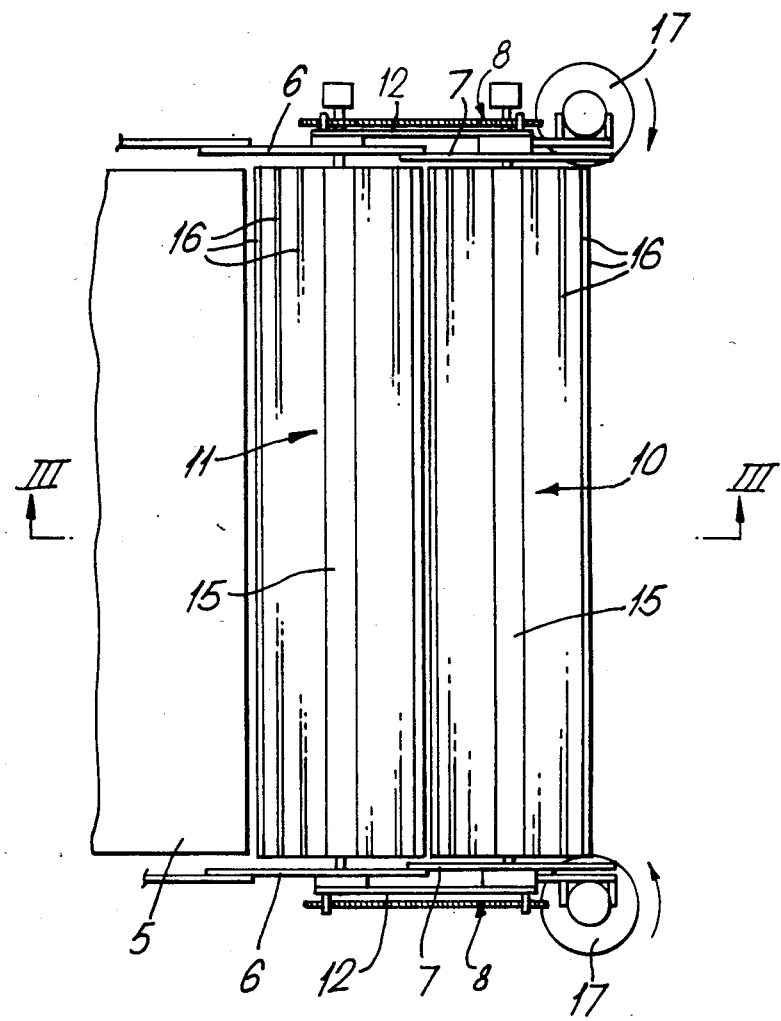
FIG. 1 is a diagrammatic plan view of a preferred collecting apparatus according to a first embodiment of the present invention and in which two conveyors are provided with upwardly-directed runs.
Figure 2:
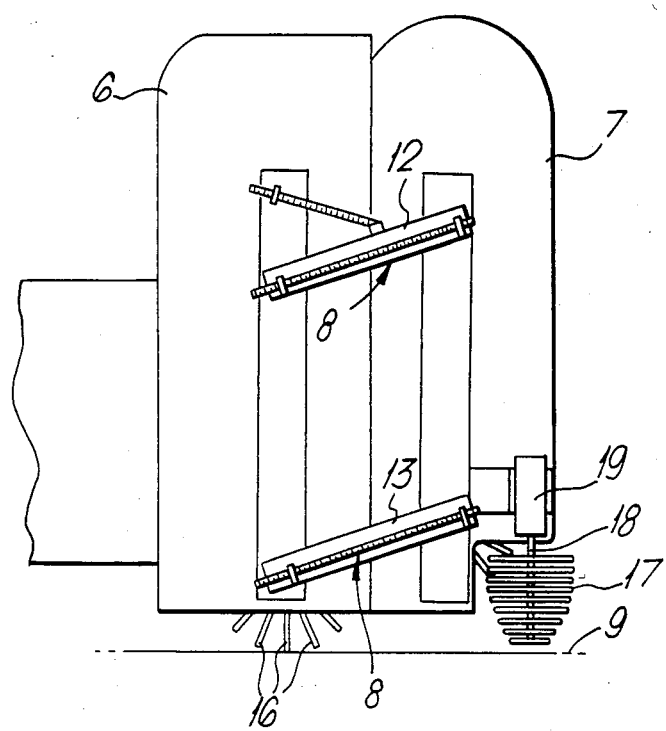
FIG. 2 is a diagrammatic side view of the apparatus shown in FIG. 1.

Referring to the first embodiment as shown in FIGS. 1 to 3 of the drawings, collecting apparatus primarily for catching and elevating live birds comprises a mobile supporting framework mounting two elongate rotatable members whose axes are parallel, and to be, in use, substantially parallel to a supporting surface 9 across which the framework is intended to be moved. The members are formed by lower terminal rollers of two endless conveyors 10 and 11. Sides 6,7 and arms 12 and 13 of the framework are shown in the drawings. The supporting framework may be incorporated into a self-propelled vehicle or may be an attachment for fitting to a self-propelled vehicle. The conveyors 10, 11 are chain-driven and adapted to be driven counter to one another and are of slat or belt type arranged in a series of strips spaced lengthwise of the lower and upper terminal rollers 14, 15. The conveyors 10, 11 are disposed on said arms 12, 13 with upwardly-directed runs spaced and parallel to one another and defining therebetween a passage at the lower end of which birds are intended to be caught and along which caught birds are elevated in use of the apparatus. Screw-adjustment to increase or decrease the depth of the passage is shown at 8.

The lower terminal roller 14 of the rearward conveyor 11 in the direction in which the framework is intended to be moved in nearer the supporting surface or ground level 9 than the lower terminal roller 14 of conveyor 10 then to the front which is spaced at a height sufficient to enable passage of a bird thereunder, as shown in the drawings, while at the rear conveyor 11 passage is prevented. The conveyors 10 and 11 are mounted on the arms 12, 13 to be spaced apart for example 25.6 cms (10 inches) with conveyor 10 spaced, for example about 17.8 cm (7 inches) above the ground, and conveyor 11 spaced for example about 10.2 cms (4 inches) above the ground 9.

The conveyors 10, 11 have outstanding from their endless surfaces resilient finger elements 16 lesser in length than the passage is deep.

Each element 16 comprises a strip of foamed-material transverse of the conveyor. To assist in directing birds toward the conveyors 10, 11, two brushes 17 each rotatable about a vertical shaft 18 and driven by motor 19, are provided one on each lateral side of the framework and driven in counter rotation to each other and inwardly towards the conveyors 10, 11.

Means to drive said conveyors 10, 11 and motors 19 may be any convenient power source additional to or taken from the motive power of the vehicle.

In use, with the arms 12, 13 of the support framework forwardly of the vehicle in the direction of movement and with the conveyors 10, 11 being driven, the vehicle is moved into the house containing the birds and towards the birds to be caught. The birds pass under the conveyor 10 and the directional flow of the elements 16 serves to sweep the bird or birds clear of the ground, and thence being held firmly thereby elevated up the passage to the upper end thereof for discharge to the next step of the series of steps, and a conveyor 5 is shown in FIG. 3 for this purpose.

Figure 4:
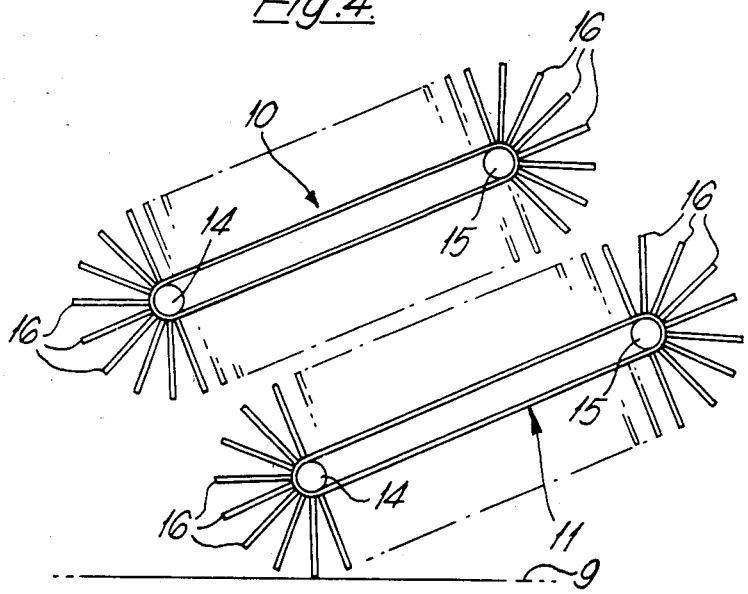
FIG. 4 is a schematic view similar to FIG. 3 and showing the runs of the conveyors being upwardly-inclined.

In a modification, the conveyors 10, 11 have upwardly-inclined runs as shown in FIG. 4.

Figure 5:
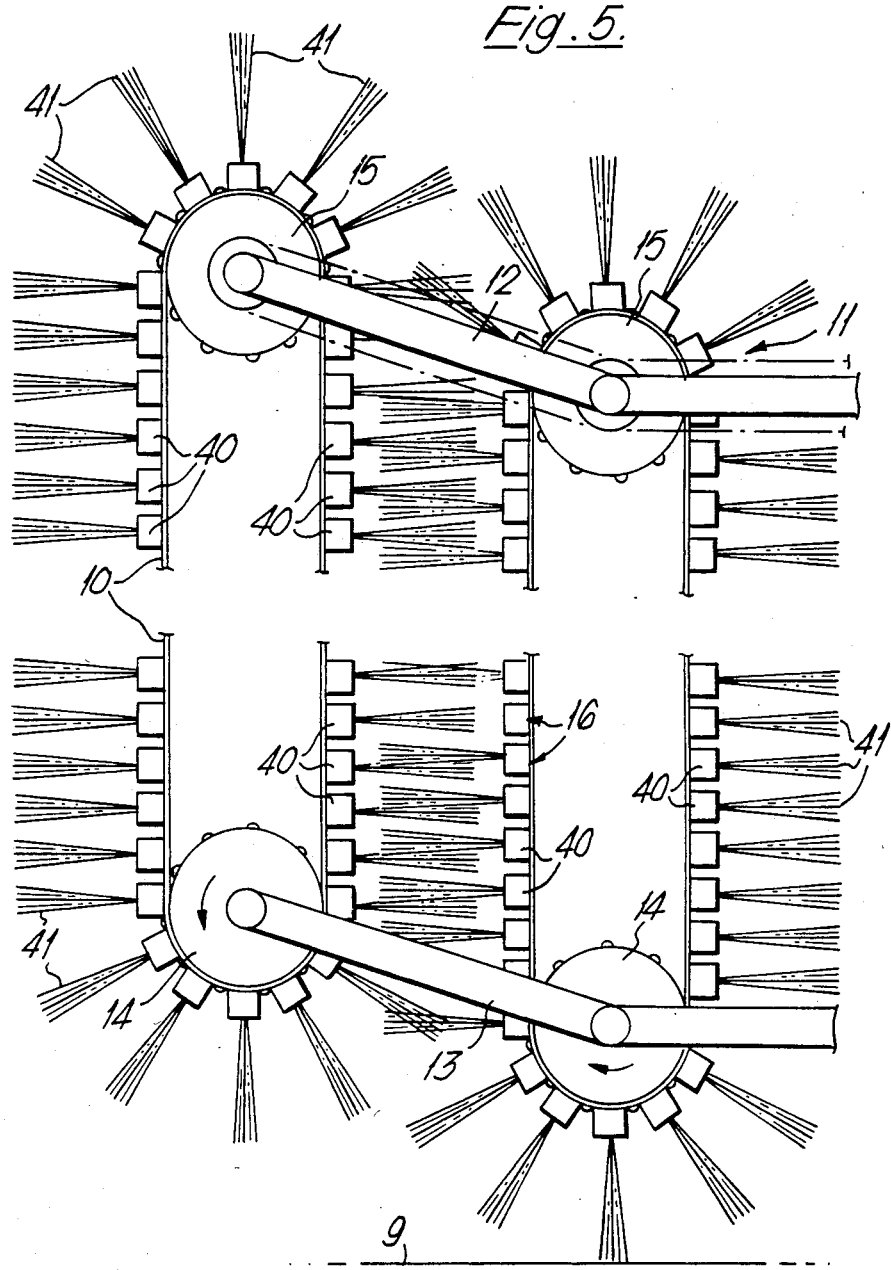
FIGS. 5,6 and 7 are schematic views similar to FIG. 3 and showing different disposition of rotatable members according to second, third and fourth embodiments respectively of the present invention.

In a second embodiment as shown in FIG. 5 in which like numerals denote like parts, each conveyor 10, 11 has rows of elements in the form of mountings 40 having monofilaments 41 outstanding therefrom.

Figure 6:
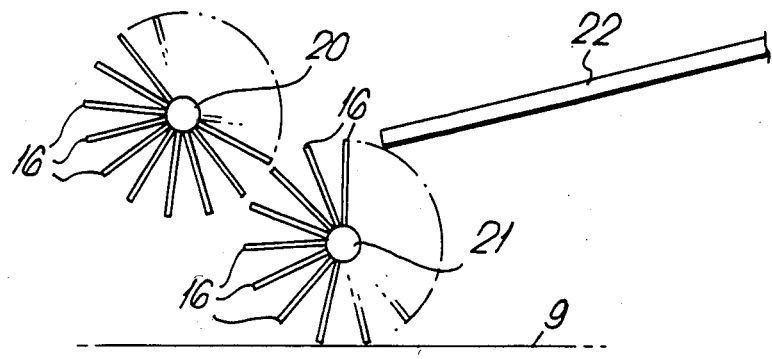

In a third embodiment as shown in FIG. 6 a simplified apparatus comprises two rollers 20, 21 mounted on a similar framework as in previous embodiments and adapted to be driven counter to one another and disposed somewhat similar to the lower terminal rollers of conveyors 10, 11. The passage is upwardly-inclined and of short length and feeds on to an inclined conveyor 22 as shown. The rollers 20, 21 have outstanding from the peripheries resilient elements 16.

Figure 7:
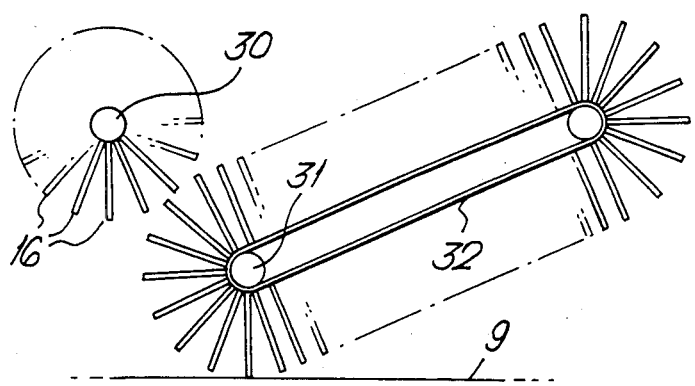

In a fourth embodiment as shown in FIG. 7, two rollers 30, 31 are provided, roller 30 being similar to roller 20, and roller 31 being similar to the rearward lower terminal roller 14, with conveyor 32 being arranged therearound.

The elements almost meet at the mid-way line of the passage as shown in the drawings apart from FIG. 5 which shows the elements overlapping.

The apparatus described in the second, third and fourth embodiment is used in the same manner as the apparatus described in the first embodiment.

In a modification of each embodiment, the elements 16 of one or both rollers or conveyors may be replaced by a jacket of foamed material whose depth is the same as the length of the elements.

It has been found in test that catching and elevating live birds is possible without damaging or bruising to the birds, or at the least, limit such bruising or damaging to a negligible or at most an acceptable level. An essential requirement for this is the cooperation between the means on both members, and it has been found preferable that the rearward member is in the form of a conveyor.

While the collecting apparatus as described above has been primarily developed for use with live birds, it can within the scope of the present invention be used also for collecting inaminate objects, such as rubbish from a rubbish-strewn field after spectators have departed at the end of a supporting event or from a beach. The choice of elements used will be determined by the rubbish to be collected.

We claim:

1. Collecting apparatus for catching and elevating animate or inanimate objects, comprising a mobile supporting framework and two elongate members mounted thereon, said elongate members adapted to be driven in opposite rotational directions about axes parallel to one another and to a ground surface, the elongate members defining between them a passage at the lower end of which objects are caught and along which the caught objects are elevated in use of the apparatus, the elongate member rearward with respect to the direction in which the apparatus is intended to be moved being nearer the ground level than the forward elongate member, such that the ground clearance of the forward member enables passage of an object therebelow while that of the rear member prevents such passage, wherein at least the rearward member is the lower terminal roller for a conveyor, said apparatus further comprising deformable resilient means lesser in length than the passage is deep, outstanding from around the forward member and from the conveyor, to ensure that the resilient means on the conveyor in cooperation with the resilient means on the forward member sweep the object or objects into the passage between the elongate members and elevate the object or objects to the upper end of the conveyor for discharge therefrom.

2. The apparatus of claim 1 wherein brushes are provided and mounted for rotation about vertical axes on either side of the opening formed between said first and second elongate members.

3. The apparatus of claim 2 wherein said brushes are rotated in opposite directions by motors.

4. The apparatus of claim 1 wherein the elongate forward member comprises a roller.

5. The apparatus according to claim 1 wherein the elongate forward member is a lower terminal roller of a second conveyor.

6. The apparatus of any one of claims 1, 4 or 5 wherein the deformable resilient means are in the form of strips of foamed material.

7. The apparatus of any one of claim 1, 4 or 5 wherein the deformable resilient means are in the form of rows of spaced bristles.

8. The apparatus of any one of claims 1, 4 or 5 wherein said deformable resilient means is in the form of a jacket of foamed material.

9. A vehicle incorporating the apparatus according to any one of claim 1 through 5.

* * * * *